Feb. 7, 1967 T. W. RITCHEY, JR., ETAL 3,303,281

SCANNING SYSTEM FOR USE IN CHARACTER READING WITH CIRCUIT MEANS TO COMPENSATE FOR LAG IN THE PHOTOCONDUCTIVE PICKUP DEVICE

Filed Oct. 11, 1963 3 Sheets-Sheet 1

INVENTORS
LUCAS J. BAZIN &
THOMAS W. RITCHEY, JR.

BY John V. Regan
Attorney

Feb. 7, 1967 T. W. RITCHEY, JR., ETAL 3,303,281

SCANNING SYSTEM FOR USE IN CHARACTER READING WITH CIRCUIT MEANS TO COMPENSATE FOR LAG IN THE PHOTOCONDUCTIVE PICKUP DEVICE

Filed Oct. 11, 1963 3 Sheets-Sheet 2

INVENTORS
LUCAS J. BAZIN &
THOMAS W. RITCHEY, JR.
BY
John V. Regan
Attorney

Fig. 3.
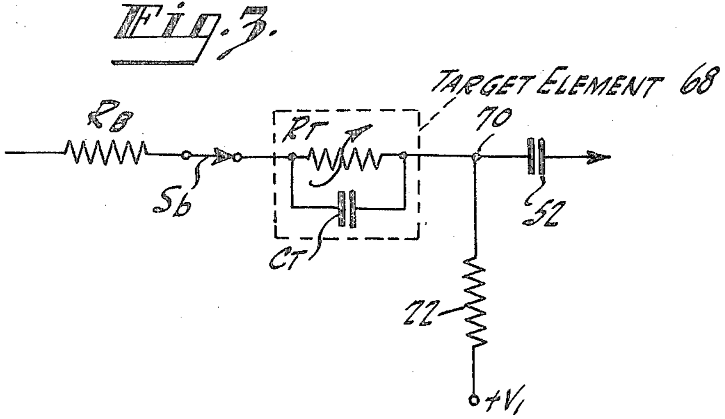
Fig. 4a
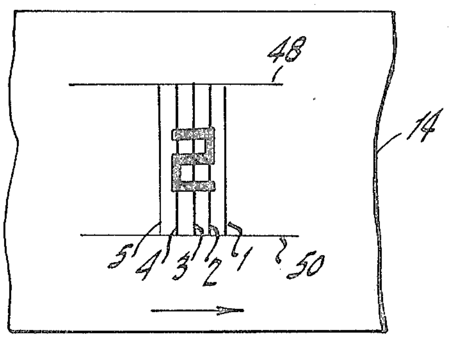
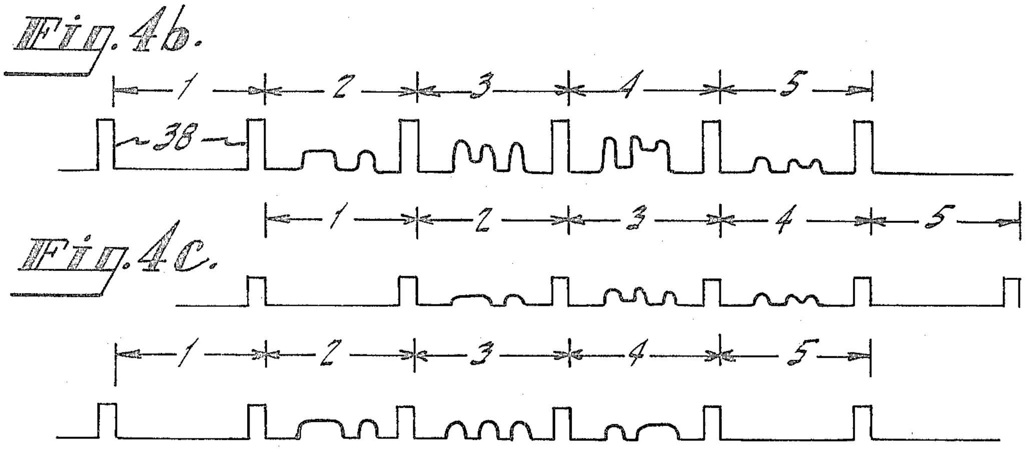
Fig. 4b. Fig. 4c.
Fig. 4d.
INVENTORS
LUCAS J. BAZIN &
THOMAS W. RITCHEY, JR.
BY John V. Regan
Attorney United States Patent Office 3,303,281

Patented Feb. 7, 1967

3,303,281

SCANNING SYSTEM FOR USE IN CHARACTER READING WITH CIRCUIT MEANS TO COMPENSATE FOR LAG IN THE PHOTOCONDUCTIVE PICKUP DEVICE

Thomas W. Ritchey, Jr., Cherry Hill, and Lucas J. Bazin, Stratford, N.J., assignors to Radio Corporation of America, a corporation of Delaware Filed Oct. 11, 1963, Ser. No. 315,628
5 Claims. (Cl. 178—7.2)

This invention relates to scanning systems, and more particularly to scanning systems employing photoconductive pickup devices. The invention is particularly applicable to optical character readers although not necessarily limited thereto.

In certain optical readers, data printed on a document are imaged onto an electro-optical pickup device and the data are successively scanned. The data may comprise alphanumeric symbols or other information capable of being identified by a computer. A distinctive set of video signals is derived for each different symbol scanned. The video signals includes pulses which denote the interception of the outline trace that forms the printed symbol. In vertical scanning, the pulses are of short duration when horizontal strokes in a symbol are intercepted and long when vertical strokes are intercepted. These differences in the video pulses comprise the basis on which different symbols are recognized by the reader. Thus, it is important that the video pulses portray a correct representation of the symbol in order to obtain accurate recognition. However, certain electro-optical pickup devices utilized in reader, for example, vidicon tubes, exhibit an inherent lag. By "lag" is meant the failure of the tube to respond instantaneously to the application and withdrawal of light. Such an inherent lag introduces into the generated video signals incorrect representations of the symbol scanned and therefore causes errors in recognizing the symbols. Heretofore certain lag correction circuits have been proposed but such circuits are exceedingly complex and expensive.

The video signals generated by the pickup device in scanning the symbols are essentially analog in form and may exhibit varying signal strengths from scan line to scan line. These may be due, for example, to the variations in the density of the ink forming the printed symbols.

Additionally, signal level variations in the generated video signals may also occur due to changes in the reflectance of the document, variations in the output of the pickup device, or changes in the illumination level of the document. Such variations are a detriment to accurate recognition.

Accordingly, it is an object of this invention to provide a new and improved scanning system for optical readers.

It is another object of this invention to provide an improved lag correction circuit for a scanning system in optical readers.

It is a further object of this invention to provide an improved scanning system for optical readers which tends to compensate for signal level variations.

A scanning system in accordance with one embodiment of the invention includes an electro-optical pickup device for successively scanning by a plurality of scan line symbols projected thereon. The pickup device generates video signals of a predetermined frequency which electrically represent the symbols scanned. To compensate for the lag introduced into the generated video signals, a fraction of the video signals in each scan is subtracted from the video signals in each succeeding scan. This is accomplished by applying the video signals of the predetermined frequency to a delay circuit, which exhibits a delay of one period of said predetermined frequency to derive video signals delayed for one scan time. A fraction of the amplitude of the delayed video signals is then subtracted from the generated video signals in a difference amplifier to derive lag corrected signals.

The lag corrected video signals are again delayed for one period of said determined frequency. During this delay, the feature signal portions of each scan line are peak detected to generate a control voltage dependent upon the peak feature signal level of each scanned line. The delayed video signals and the control voltage are simultaneously applied to quantizing means. The control voltage sets the triggering level at which the lag corrected video signals are quantized so that each scan of the lag corrected video signal is quantized at substantially the same percentage of its peak regardless of its signal level. Additionally, the delayed video signals are also peak detected to generate an automatic gain control voltage which is fed back to control the gain of the electro-optical pickup device.

In the drawings:

FIGURE 3 is a simplified equivalent circuit diagram helpful in explaining the inherent lag in the pickup device of FIGURE 1; and FIGURE 4, comprising FIGURES *4a* to *4d*, is a schematic representation of the scanning of a symbol which is helpful in explaining the correction of lag in the system of FIGURE 1.

Figure 1:
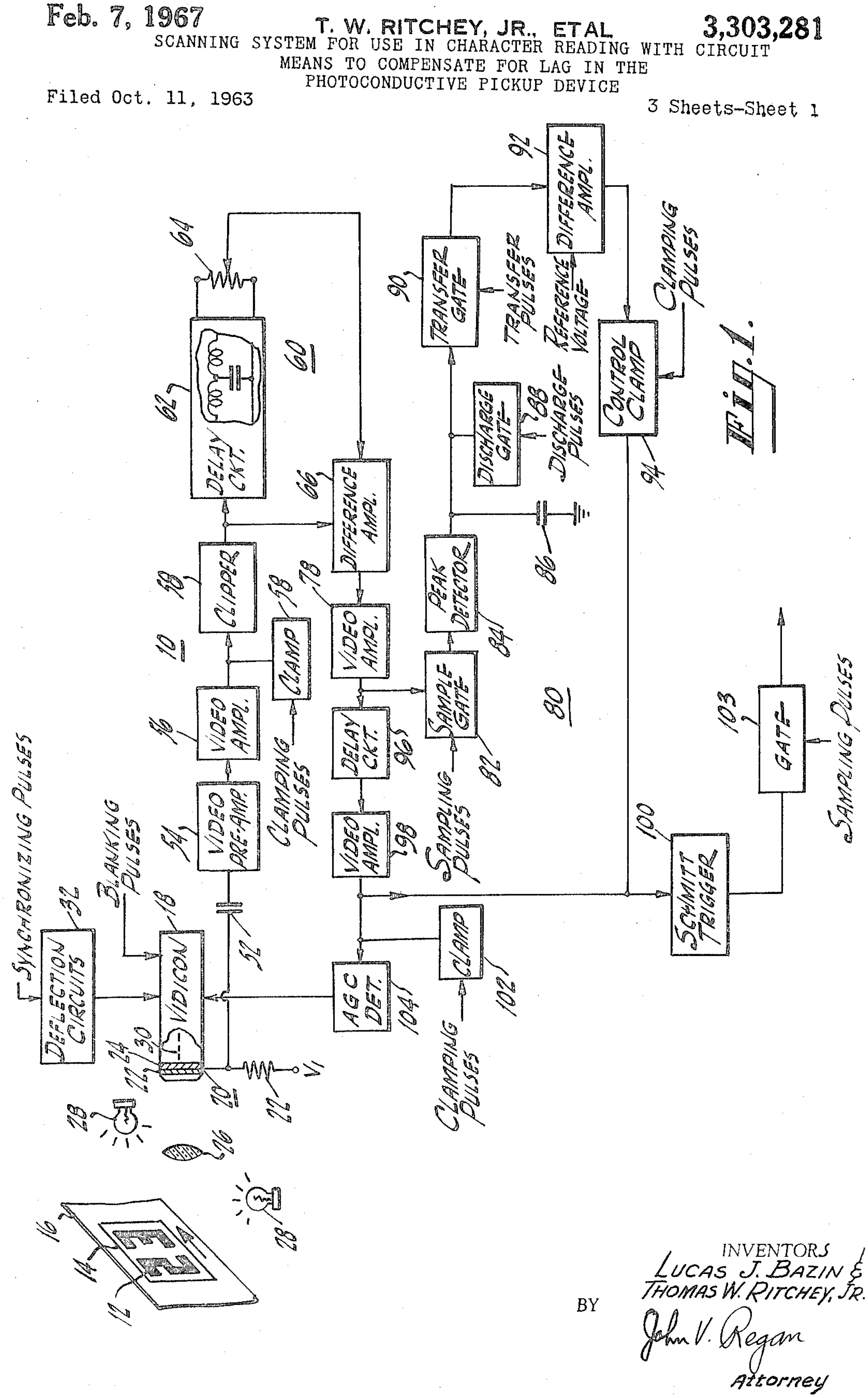
FIGURE 1 is a block diagram of a scanning system in accordance with the invention.

In FIGURE 1 there is illustrated a scanning system 10 for reading symbols from a document. The symbols may, for example, be numeric characters 12 printed with dark ink on a light document 14. The document 14 is positioned adjacent to, and moved past, the scanning system 10 by a transport mechanism 16 which positions the document 14 so that the characters 12 are scanned by an electro-optical pickup device 18 in the scanning system 10. The pickup device 18, which may, for example, comprise a vidicon tube, includes a target electrode 20, which is supported on the face of the tube 18 and biased from a positive potential source $V_1$ through a load resistor 22. The target 20 comprises a transparent conductor or signal plate 22 having a layer of photoconductive material 24 deposited thereon. The characters 12 are imaged onto the target 20 by an optical lens system, shown schematically as a single convex lens 26. A pair of light sources 28 are spaced on either side of the pickup tube 18 to illuminate the document 14. Two light sources are used to prevent the generation of shadows on the document 14 and also to provide a high level of illumination for the pickup tube 18.

The characters 12 are imaged consecutively onto the target 20 due to the movement of the document 14, in the direction of the arrow shown thereon, by the transport mechanism 16. The electron beam 30 in the vidicon 18 is deflected vertically by deflection circuits 32. The vertical deflection of the electron beam 30 may, for example, be electrostatic and the deflection waveform is shown as the curve 34 in FIGURE 2. The horizontal movement of the document 14 at a uniform velocity and the vertical deflection of the electron beam 30 in a single line, effectively cause each character to be scanned substantially orthogonally. The deflection circuits 32 are synchronized by synchronizing pulses 36 applied therto. The synchronizing pulses are shown as the topmost curve in FIGURE 2 and are generated by a timing generator (not shown) which also generates blanking 38, sampling 40, clamping 42, discharge 44 and transfer 46 pulses, all shown in FIG- URE 3. The use of these pulses will be described subsequently.

The single line vertical scanning cycle of the electron beam 30 comprises a relatively slow trace scan starting from an initial position 48 (FIGURE 4) above the character and ending at a terminal position 50 below the character. The characters 12 are typically 0.1 inch high and are over-scanned two and one-half times to compensate for misalignment. The trace scan is followed by a rapid retrace back to the initial position. Periodically occurring blanking pulses 38 (FIGURE 2) are applied to the cathode of the pickup tube 18 during retrace to cut off the electron beam during this time. The blanking pulses 38 begin slightly before the synchronizing pulses 36 (FIGURE 2) and are longer in duration than the synchronizing pulses to blank the pickup device 18 during the entire retrace period. The period of the blanking pulses 38 may, for example, be on the order of 46.6 microseconds with the blanking pulse width being 6.6 microseconds. The scanning rate is therefore approximately 22 kilocycles. A typical printed character 12 may be .07 inch wide with a .03 inch margin surrounding the character. The characters 12, including their margin, are scanned by a total of 14 scans and the transport mechanism 16 has a uniform velocity of substantially 153 inches per second. Thus, approximately 1530 characters are scanned by the scanning system 10 each second.

The video signals derived from the pickup device 18 includes a plurality of feature signal scan lines, which, in toto, comprise a character image signal which electrically represents the character being scanned. Additionally, the regularly recurring blanking pulses are also present in the video signals. The feature signals increase in amplitude toward a black level, which is the peak amplitude of the blanking pulses 38. The base of the blanking pulses 38 is considered to be white level. The more contrast that exists between the dark print of the characters and the light document, the larger the feature signals, and the more their peaks approach black level.

The video signals from the pickup device 18 are coupled through a capacitor 52 (FIGURE 1) and amplified by a video pre-amplifier 54 and a first video amplifier 56. The amplified video signals are clamped to a predetermined level by a synchronous clamp 58 to restore the D.C. component lost in the A.C. coupling of the video signal. The clamping pulses 42 (FIGURE 2) are shorter in duration than the blanking pulses 38 and are applied to the clamp 58 during the latter half of the blanking pulse 38 width. This is done to clamp the video signals at a time when transients have died down in the blanking pulses 38. The video signals generated by the pickup device 18 are normally smaller in amplitude than the blanking pulse level. Consequently, the clamped video signals are applied to clipper 58 which clips the excess blanking pulse peaks.

The clipped video signals are applied to a lag correction circuit 60. The lag correction circuit 60 includes a delay circuit 62 which may, for example, comprise a passive delay line including a plurality of lumped inductors and capacitors connected to simulate a transmission line. The delay circuit 62 is selected to introduce a delay of one period (46.6 microseconds) into the video signals. An attenuator 64, which may comprise a potentiometer, is coupled across the output of the delay circuit and a fraction of the amplitude of the delayed video signals is applied to a difference amplifier 66. Additionally, the direct video signals from the clipper 59 are also applied to the other input of the difference amplifier 66. The difference amplifier 66 subtracts the fraction of the delayed video signals from the direct video signals to derive lag corrected video signals.

The operation of the scanning system 10 in deriving lag corrected video signals will now be described. A vidicon, such as an RCA type C74129, may be utilized as the pickup device 18 in the scanning system 10. However, a vidicon exhibits an inherent lag. The lag exhibited is of two types: material lag and capacitive lag. Material lag is the failure of the photoconductive material to respond instantaneously to the application and withdrawal of light. Capacitive lag is the failure of the effective capacitance of the target electrode to discharge between successive scans.

In FIGURE 3 there is shown an approximate equivalent circuit diagram of an elemental target area of the vidicon 18 when the target area is being scanned. The electrical operation of the target element 68 approximates the parallel combination of a capacitor $C_T$ and a resistor $R_T$. The resistor $R_T$ is shown as variable to account for the fact that the photoconductive material exhibits a relatively low resistance in light and a relatively high resistance in darkness. The target element 68 is connected in series with a switch $S_B$ and a resistor $R_B$. The switch $S_B$ is closed when the electron beam is scanning the element 68 and open otherwise. The resistor $R_B$ is the effective resistance of the electron beam. The equivalent circuit is completed through the load resistor 22 and the positive potential source $V_1$. The entire target electrode 20 includes a multiplicity of target elements 68, all connected in parallel.

When the vidicon is energized, but in darkness, the elemental capacitor $C_T$ charges up to the bias potential of the voltage source $V_1$ after a few scans. The capacitor $C_T$ does not discharge between scans because the resistance $R_T$ of the photoconductive material is extremely large in darkness. Substantially no current flows through the load resistor 22 and consequently the potential at the output terminal 70 is at the bias potential $V_1$, which represents black level. When the vidicon 18 is illuminated by reflected light from the white document 14, the resistance $R_T$ decreases substantially and tends to discharge the capacitor $C_T$. The flow of current through the load resistor 22 due to the decreased resistance of $R_T$ causes the potential at the output terminal 70 to drop and represents white level.

Capacitive lag is introduced by the failure of the capacitor $C_T$ to charge instantaneously in darkness and discharge to a lower level instantaneously in light. Material lag is introduced by the failure of the photoconductive material to decrease resistance instantaneously upon the application of light and to increase resistance instantaneously upon the withdrawal of light. The two effects results in a total lag which is additive. As a consequence of this lag, the video signals generated by the vidicon 18 do not accurately represent the characters being read.

Referring to FIGURE 4, there are illustrated somewhat idealized versions of the "laggy" video signals generated by the vidicon 18 in scanning the character numeral 2. The numeral 2 and the surrounding margin is shown sliced by a plurality of lines numbered one through five, which represent scan lines. Only five scan lines are shown to simplify the explanation. It is to be recalled that the vidicon 18 actually scans only one vertical line continuously, with the motion of the document providing the scanning in the horizontal directions. However, for simplification, the scanning is represented by the raster of FIGURE 4*a*.

In FIGURE 4*b* the video signals produced by the five scans are shown. The video signals include blanking pulses 38 which occur at the end of each scan during retrace. Scans 2, 3 and 4 include feature signals comprising video pulses produced by the interception of the outline trace of the numeral 2. The combination of scans 2, 3 and 4 comprise a character image signal which electrically represents the numeral 2.

Scan 1 produces no feature signals because the intermargin space is scanned. Scan 2 produces a relatively long video pulse when the upper right vertical stroke of the numeral 2 is intercepted and a smaller video pulse when the lowest horizontal stroke is intercepted. Scan 3 should produce three distinct video pulses because three horizontal strokes are intercepted. However, due to the lag of the vidicon 18, the first two video pulses are bridged together. In addition, the other video pulse in scan 3, which is produced by the interception of the lowest stroke in the numeral 2, is larger than the corresponding pulse in scan 2. These effects are due to the fact that a portion of the character information from one scan is effectively carried over into the next scan. This carry over is caused by the fact that, in one line scanning, the target elemental capacitor $C_T$ does not have time to discharge between successive scans. The effect of this lag is most noticeable in scan 5. This scan should not exhibit any feature signals at all since the intermargin space is being scanned. However, the lag causes a portion of the signal information in scan 4 to be carried to scan 5. Thus, erroneous signal information is generated which makes accurate recognition extremely difficult.

Lag may be reduced by increasing the illumination level produced by the light sources 28 in FIGURE 1. However, a limit is rapidly reached because at high level of illumination the document 14 burns. Lag may also be reduced by slowing down the scanning rate, thereby giving the elemental target capacitors the time to discharge between scans. However, this slows down the reading rate of the optical character reader which is undesirable.

The scanning system 10 corrects for lag by subtracting from each scan the portion of the signal information carried over from the preceding scan. Thus, the clipped video signals from the clipper 59 of FIGURE 1 are applied to the delay circuit 62 to introduce a delay of one scan time into the video signal. The attenuator 64 selects the fraction of the delayed video signals which approximates the carry over (which may typically be 40%) and applies the fraction (FIGURE 4*c*) to the difference amplifier. The direct video signals (FIGURE 4*a*) are also applied to the difference amplifier 66. The delayed video signals are subtracted from the direct video signals by the difference amplifier 66 to remove the misinformation contained in the direct video signals. The subtraction of the signals of FIGURE 4*c* from the signals of FIGURE 4*b* produces the lag corected video signals shown in FIGURE 4*d*.

Figure 2:
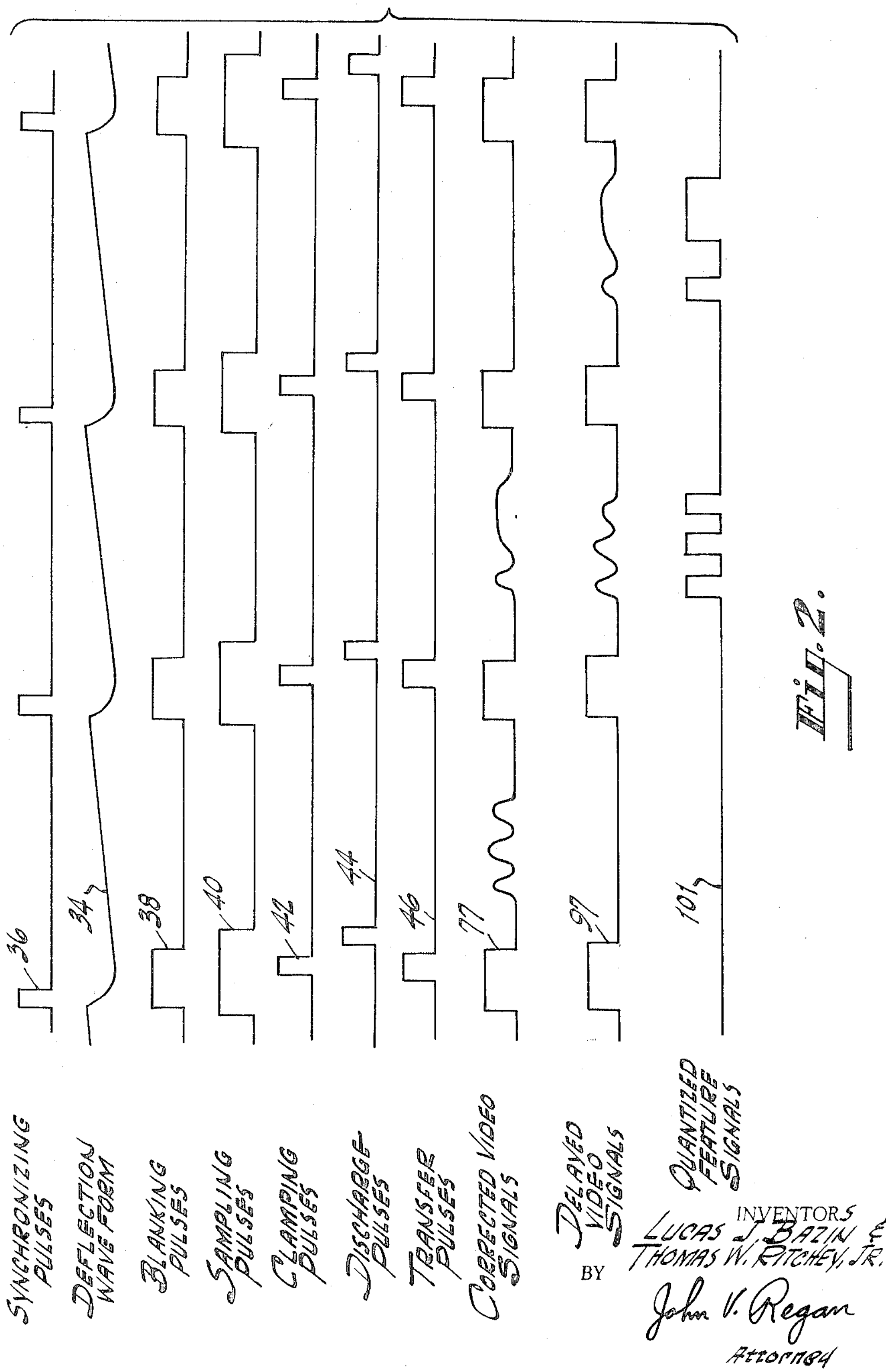
FIGURE 2 is a series of graphs showing representative waveforms occurring at various points in the system of FIGURE 1.

Referring back to FIGURE 1, the lag corrected video signals are amplified by a second video amplifier 78 and then applied to a "pre-look" circuit 80. The "pre-look" circuit 80 looks at each scan line before it is quantized to determine the proper triggering level to cause each scan line to be quantized at a fixed fraction (e.g., two-thirds) of its peak point with reference to white level, regardless of its signal level. The lag corrected video signals 77 (FIGURE 2) from the amplifier 78 are applied to a sample gate 82. The sample gate 82 is periodically gated closed by the application of sampling pulses 40 thereto. As shown in FIGURE 2, the sampling pulses 40 begin before the blanking pulses 38 and end after them. Thus, the sample gate 82 blocks the blanking pulses and passes only the video feature signals in each scan line. The feature signals are applied to a peak-to-peak detector 84 which detects the peak-to-peak amplitude of the feature signal pulses in each scan line and stores the voltage on a capacitor 86. The detector 84 and capacitor 86 are coupled to a transfer gate 90 which is gated by transfer pulses 46 (FIGURE 2) at the end of every scan to transfer the selected fraction of the stored voltage to a difference amplifier 92. The transfer pulses 46 overlap the clamping pulses 42 to insure that the transfer occurs during the clamping period. Thus, the detector 84 generates a D.C. voltage on the capacitor 86 which is representative of the peak-to-peak amplitude of the feature signals during a given scan line. At the end of the scan line, a fraction of the voltage is transferred through the transfer gate 90 to the difference amplifier 92 along with a reference voltage from a voltage source (not shown). After this transfer, the capacitor 86 is discharged by a discharge gate 88 which is activated by discharge pulses 44. Thus, the discharge gate 88 removes any voltage stored on the capacitor 86 from a previous scan. The output of the difference amplifier 92 is a control voltage which equals a constant minus the selected fraction of the peak amplitude of the video feature signals in each scan line. The control voltage from the amplifier 92 is applied to a control clamp 94 which changes its clamping level as a function of the magnitude of the control voltage. The clamp 94 clamps the lag corected video signals at different levels so that the video signals are quantized at the same selected fraction of their peak value with reference to white level during each scan line.

During the generation of the control voltage in the "pre-look" circuit 80, the lag corrected video signals are traversing a second delay circuit 96. The output of the delay circuit 96 is coupled to a final video amplifier 98 which counteracts the loss in the delay circuit 96. The amplified and delayed video signals from the amplifier 98 are applied to a quantizer or Schmitt trigger 100. The magnitude of the peak amplitude of the blanking pulses in the video signals derived from the video amplifier 98 is selected to be the magnitude of the reference voltage applied to the difference amplifier 92 in the "pre-look" circuit 80.

The delay introduced by the delay circuit 96 permits the "pre-look" circuit 80 to develop a control voltage that is a function of the peak amplitude of the feature signals passing through the delay circuit 96. Thus, at the time the video signals are applied to the Schmitt trigger 100, the control voltage is simultaneously applied to the control clamp 94. The control clamp 94 clamps the video signals at a low level when the video signals are large, and clamps the video signals at a higher level when the video signals are small. Therefore, each scan of the video signal is quantized at substantially the same fraction of their peak value with reference to white level. Such operation tends to insure that each feature signal pulse is quantized in each scan notwithstanding the fact that such pulses may vary appreciably in amplitude from scan-to-scan and character-to-character due, for example, to the varying density of the ink impressions of the characters on the document.

The Schmitt trigger 100 quantizes each scan line of video signals to produce uniform amplitude squarewave pulses. The squarewave pulses are applied to a gate 103 which is gated by the sampling pulses 40 to remove the blanking pulses from the quantized video signals. The resultant quantized feature signal pulses, as shown by the curve 101 in FIGURE 2, have fast rise and fall times and a duration representative of the strokes intercepted in the character being scanned.

The output signals from the vidicon 18 are also subject to variations due to the heating of the vidicon, fluctuations in the power supply, and the like. An automatic gain control circuit is therefore included in the scanning system 10 to provide substantially constant output signals from the vidicon 18. The delayed video signals from the video amplifier 98 are clamped to ground by a synchronous clamp 102 and applied to an automatic gain control peak detector 104. The A.G.C. peak detector 104 generates a control voltage which is a function of the peak amplitude of the blanking pulse level in the video signals. The control voltage generated by the detector 104 is applied to the grid of the vidicon 18 to control the gain thereof.

Thus, a scanning system 10 has been described which cancels the effects of vidicon lag to obtain a non-storage electro-optical pickup device required for accurate character recognition. Advance information is obtained about the amplitude of the actual video information signals before they are applied to a quantizer, so that a quantizing level proportional to the peak amplitude of the signals in each scan is derived. This operation compensates, among other things, for variations in the print density of characters. Therefore, documents printed by various makes of printers can be read with equal reliability. The system 10 also includes an A.G.C. loop tending to compensate for any possible variations in the light sources, the electro-optical pickup device and in document reflectivity.

What is claimed is:

1. In an optical character reader for reading symbols printed on a document, the combination comprising, a photoconductive pickup device for scanning one scanline repeatedly at a predetermined line scan repetition rate, means for transporting a document past said photoconductive pickup device so that symbols on said document are scanned by a plurality of scanlines to generate video signals that electrically represent said symbols, said pickup device exhibiting an inherent lag, means coupled to said pickup device for introducing into said generated video signals of said predetermined repetition rate a time delay of one period of said predetermined repetition rate to derive delayed video signals with each scan line delayed one scan time, and means for subtracting a fraction of the amplitude of said delayed video signals from said generated video signals so that a fraction of the video signals in each scan is substracted from the video signals in each succeeding scan to derive lag corrected video signals.

2. In an optical character reader for reading symbols printed on a document, the combination comprising, a photoconductive pickup device for scanning one scanline repeatedly at a predetermined line scan repetition rate, means for transporting a document past said photoconductive pickup device so that symbols on said document are scanned by a plurality of scanlines to generate video signals that electrically represent said signals, said pickup device exhibiting an inherent lag a delay circuit having a time delay of one period of said predetermined repetition rate, means for applying said generated video signals of said predetermined repetition rate to said delay circuit to derive delayed video signals with each scan line delayed one scan time, and means for subtracting a fraction of the amplitude of each scan line of said delayed video signals from each succeeding scan line of said generated video signals to derive lag corrected video signals.

3. In an optical character reader for reading symbols printed on a document, the combination comprising, a photoconductive pickup device for scanning one scanline repeatedly at a predetermined line scan repetition rate, means for transporting a document past said photoconductive pickup device so that symbols on said document are scanned by a plurality of scanlines to generate video signals that electrically represent said signals, said pickup device exhibiting an inherent lag, a delay circuit having a time delay of one period of said predetermined repetition rate, means for applying said generated video signals of said predetermined repetition rate to said delay circuit to derive delayed video signals with each scan line delayed one scan time, a difference amplifier having first and second pairs of input terminals and a pair of output terminals for subtracting from signals applied to said first pair of input terminal signals applied to said second pair of input terminals, and means for applying to said first pair of input terminals said generated video signals and to said second pair of input terminals a fraction of the amplitude of said delayed video signals to derive from said output terminals lag corrected video output signals.

4. In an optical character reader for reading symbols printed on a document, the combination comprising, a photoconductive pickup device for scanning one scanline repeatedly at a predetermined line scan repetition rate, means for transporting a document past said photoconductive pickup device so that symbols on said document are scanned by a plurality of scanlines to generate video signals that include feature signals that electrically represent said symbols, said pickup device exhibiting an inherent lag, a first delay circuit having a time delay of one period of said predetermined repetition rate, means for applying said generated video signals to said first delay circuit to derive delayed video signals with each scanline delayed one scan time, a difference amplifier, means for applying said generated video signals and a fraction of said delayed video signals to said difference amplifier to subtract a fraction of the video signals in each given scan line from the video signals in each succeeding scan line to derive lag corrected video signals, a second delay circuit having a time delay of one period of said predetermined repetition rate coupled to said difference amplifier for delaying said lag corrected video signals for one scan time, means coupled to said difference amplifier for generating a control voltage corresponding to the peak amplitude of the feature signals in said lag corrected video signals during the time said lag corrected video signals are in transit through said second delay circuit, quantizing means for generating uniform amplitude output signals from input signals that exceed a triggering level, means for applying said control voltage to said quantizing means to vary the triggering level in accordance with the amplitude of said control voltage, means coupling said second delay circuit to said quantizing means to quantize said delayed lag corrected video signals at a triggering level that is a function of said control voltage so that each scanline is quantized at substantially the same fraction of the peak amplitude of the feature signals regardless of differences in such peak amplitudes from scanline-to-scanline.

5. A scanning system for scanning symbols printed on a document, comprising the combination of, a photoconductive pickup device for scanning one scanline repeatedly at a predetermined line scan repetition rate, means for transporting a document past said pickup device so that symbols on said document are scanned by a plurality of scanlines to generate video signals that include feature signals that electrically represent said symbols, said photoconductive pickup device exhibiting an inherent lag in the generation of such signals, means coupled to said pickup device for subtracting a fraction of the amplitude of the video signals in one scan line from the video signals in the next succeeding scan line to derive lag corrected video signals, delay means coupled to said subtracting means for delaying said lag corrected video signals, means coupled to said subtracting means for generating a control voltage corresponding to the peak amplitude of the feature signals in said lag corrected video signals during the time said lag corrected video signals are in transit through said delay means, quantizing means for generating uniform amplitude output signals from input signals which exceed a triggering level, means for applying said control voltage to said quantizing means to vary the triggering level in accordance with the amplitude of said control voltage, means coupling said delay means to said quantizing means to quantize said delayed and lag corrected video signals at a triggering level which is a function of said control voltage so that each scan line is quantized at substantially the same fraction of the peak amplitude of the feature signals regardless of differences in the peak amplitudes from scan line-to-scan line, means coupled to said delay means for generating an automatic gain control voltage as a function of the peak amplitude of said delayed and lag corrected video signals, and means for feeding back said automatic gain control voltage to said pickup device to maintain the generated video signals substantially constant.

No references cited.

DAVID G. REDINBAUGH, *Primary Examiner.*

J. McHUGH, R. L. RICHARDSON, *Assistant Examiners.*